Feb. 18, 1969   A. BASIULIS   3,428,773
IN-LINE, HIGH TEMPERATURE, HIGH VACUUM CLOSURE
Filed Aug. 4, 1967

INVENTOR.
ALGERD BASIULIS
BY

United States Patent Office 3,428,773
Patented Feb. 18, 1969

3,428,773
IN-LINE, HIGH TEMPERATURE, HIGH
VACUUM CLOSURE
Algerd Basiulis, Redondo Beach, Calif., assignor, by mesne assignments, to the United States of America as represented by the United States Atomic Energy Commission
Filed Aug. 4, 1967, Ser. No. 658,994
U.S. Cl. 219—50                    2 Claims
Int. Cl. H05b 3/18, 3/48, 7/12

ABSTRACT OF THE DISCLOSURE

In the manufacture of high temperature, low pressure devices, such as thermionic converters, an in-line method of closing and severing a tube connecting the converter and an evacuating and/or filling device therefor by sequentially passing electrical resistance heating currents of constant and increasing values through a high electrical resistance, circuit breaking, fusible venturi link in a nickel tube adapted on its outside to be exposed to a vacuum and on its inside containing a gas passage forming copper wire, thereby sequentially to form a nickel-copper solid solution alloy that seals across the venturi and then breaks the heating current circuit across the middle of the venturi so as to permit the effective evacuation and/or filling of the converter followed by the separating of the converter from the filling and/or evacuating device while maintaining the material and pressure in the converter and a stable temperature equilibrium therein.

Cross-reference to related applications

Ser. No. 538,926, filed Mar. 29, 1966, by William E. Harbaugh, for "Thermionic Converter" assigned to the assignee of this application.

Background of the invention

This invention was made in the course of, or under a contract with the United States Atomic Energy Commission.

Thermionic conversion of heat to electricity has been the subject of considerable investigation for many years and contributions have been made towards increased understanding of the basic characteristics of these devices and the material required therefor, but it has been long recognized that there has been a need for a practical and economic method for providing optimum gas pressure within the converter, as described in the above cited copending application. Moreover, it is critical during processing of these converters to provide a stable high temperature equilibrium and the proper pressure and amount of interelectrode gas, such as cesium, for space-charge neutralization so that the converter operates properly at a range of temperatures between 600° C. (collector temperature) and 1200° C. (emitter-heat dam temperature) with low gas pressures therein e.g., from 0.3 to 9 torr. To this end it is advantageous to bake-out the entire converter assembly at the desired high temperature, activate electron bombardment in the converter, out-gas the converter at the high temperature, fill the converter from a cesium reservoir at from 500±50° to 700±5° C. with a precise preselected amount of cesium at the preselected low cesium pressure and high temperature, and to separate the converter from the evacuating and/or cesium filling device while maintaining the material and pressure and a stable temperature equilibrium in the converter. A hot closure is also advantageous for filling the converter from a liquid cesium reservoir through a tube enclosed in a vacuum.

It is an object of this invention, therefore, to provide an economical and reliable system for the sealing of the evacuating and/or filling tube and the separation of the tube from the evacuation and/or filling source by providing a controlled fusible, circuit breaking, electrical resistance heating of a circuit breaking, fusible venturi link in the tube;

It is a further object to provide means for sealing and severing a tube in such a way as to avoid loss of material or pressure therefrom;

It is a further object to seal and sever a tube connected to a high temperature low pressure system so as to maintain a stable high temperature equilibrium in the system;

A further object is to provide a system of sealing and severing a tube in a vacuum.

Summary of the invention

The foregoing objects are achieved by sequential electrical resistance heating of a high electrical resistance, fusible, circuit breaking, venturi in a nickel tube having a slotted copper wire therein. In one embodiment, the sequential electrical resistance heating comprises applying a first predetermined constant electrical resistance heating current across a nickel, fusible, circuit breaking venturi to produce a solid solution alloy between the nickel venturi and the copper wire therein so as to seal the venturi shut, and slowly increasing the current selectively to break the circuit by severing the tube at the mid-point of the venturi so as to produce a quickly cooling seal that solidifies in the ends of the severed venturi from terminal menisci that maintain both the pressure and the material constant in both ends of the tube where it is severed. With the proper selection of elements and currents, the sealing and severing is accomplished reliably and quickly in a vacuum while minimizing any disturbance to the temperature equilibrium of the systems to which the severed ends of the tube are connected.

The above and further objects and novel features of this invention will appear more fully from the following detailed description when the same is read in connection with the accompanying drawings. It is to be expressly understood, however, that the drawings are not intended as a definition of the invention but are for the purpose of illustration only.

Brief description of the drawings

In the drawings where like elements are referenced alike.

Description of the preferred embodiment

Figure 1:
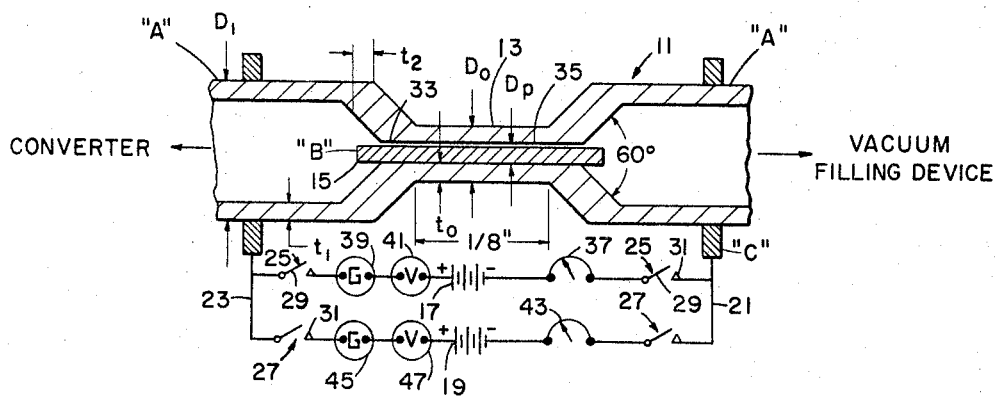
FIGURE 1 is a partial cross-section of the fusible, circuit breaking venturi of this invention having relatively high and low electrical resistance sections and a slotted metal wire therein.
Figure 2:
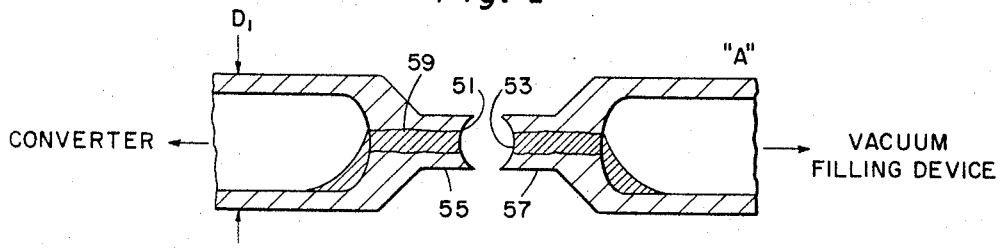
FIGURE 2 is a partial cross-section of the tube of FIG. 1 illustratting the sealing, severing and circuit breaking thereof in accordance with this invention.

Referring to FIG. 1, the nickel venturi 11 connects the thermionic converter which is at its high operating temperature and low pressure, with suitable evacuating and/or cesium vapor filling systems, as are well known in the art. The venturi 11 has a fusible, circuit breaking, high resistance, narrow, middle portion 13 of predetermined dimensions between two high resistance coupling ends A that connect with the converter and the filling and/or evacuating device and this narrow middle venturi portion contains a slotted copper wire 15 on the inside thereof. The outside of venturi 11 is adapted to be confined in a vacuum provided by a suitable vaccum enclosure and pump device, such as are well known in the art. One converter adapted to operate at the above-mentioned high temperature and low pressure, is shown in the above-mentioned copending application and suitable low pressure evacuated systems comprise well known enclosures and vacuum pumps. One suitable filling system advantageously comprises a vacuum pump connected through venturi tube 11 to a converter being independently separately pumped, and a cesium reservoir connected to the converter through venturi tube 11 to supply predetermined, precise amounts of cesium vapor at predetermined low pressures and temperatures througr venturi tube 11 and past wire 15 for transfer to the converter. The venturi advantageously forms a section of a long tube having electrically insulated connections between the converter and the evacuating and/or filling device.

Advantageously, the elements involved in the in line system of this invention, comprise a fusible, nickel, circuit breaking venturi 11, copper wire 15, a suitable electrical energy source, comprising sequentially actuated first and second batteries 17 and 19 for producing different current and voltage levels, electrical leads 21 and 23 and suitable switches 25 and 27 having like armatures 29 and contacts 31 so as selectively to provide the desired current and voltage levels from one end of the electrical energy source through the fusible, circuit breaking middle venturi portion 13 and copper wire 15 back to the other side of the source. While a variable direct current battery source with two batteries is shown, other systems such as a variable alternating current source having a suitable autotransformer control for varying the current and voltage to the venturi can also be used. The venturi is advantageously enclosed in a vacuum chamber by suitable means well known in the art.

In operation, the fusible, circuit breaking middle portion 13 having wire 15 therein is installed as a link in a tube by suitably soldering the low electrical resistance enlarged end portions "A" across a space between sections of tube connecting the thermionic converter with an evacuating and/or filling device therefor to make one continuous tube therebetween. The converter is outgassed to a pressure of about $10^{-4}$ to $10^{-6}$ inches of mercury through a space 33 in a small slot forming a suitable space 34 such as a wedge shaped space, on the outside of a copper wire approximating the inside diameter of the venturi aperture in its narrow middle portion 13, this pressure being approximated by the vacuum on the outside of the venturi 11 and the converter. Following outgassing, the converter is charged in the opposite direction through venturi 11 with cesium vapor that passes through the same passage and space 33.

Closure is accomplished, with the portion 13 having its maximum electrical resistance initially, by heating the venturi electrically to a temperature of 1100°–1150° C. by closing switches 25 while switches 27 are open so that current circulates from source 17 through venturi 11 to melt the copper wire 15 and to alloy it with the inside venturi wall 35. The venturi is soaked at this temperature for from one to two minutes to complete the alloying and the copper in its molten state. Advantageously, the current is 150 to 200 amps at 1½ to 2 volts as determined by rheostat 37 and as indicated by galvanometer 39 and voltmeter 41. Since copper melts at about 1083° C. and nickel melts at about 1453° C. the temperature produced is above the melting point of the copper and below the melting point of the nickel.

After from one to two minutes, the current passing through venturi 11 and leads 21 and 23 is slowly increased until the circuit breaking venturi portion 13 melts at its mid-point across outside diameter $D_0$, breaks the heating current circuits and separates the converter from the cesium filling reservoir. To this end switches 27 are closed to increase the voltage and current passing through the circuit breaking portion 13 and leads 21 and 23 by connecting source 19 in parallel with source 17, the current being determined by rheostats 37 and 43 as indicated by galvanometers 39 and 45 and voltmeters 41 and 47. To this end the current is slowly increased to 250–300 amps at 2–3 volts in about one minute, whereby the circuit breaking venturi separates at its mid-point without disturbing the high temperature equilibrium of the converter to which it is attached. This also forms opposite terminal menisci 51 and 53 at the opposite severed ends 55 and 57 of the venturi, which cool to solidify with the alloy 59 therein. The switches 25 and 27 are then opened for the beginning of the next cycle for the sealing of the next venturi and another converter.

In the example described and shown in FIG. 1, the dimensions for providing the required electrical resistance, controlled resistance heating and circuit breaking in the venturi are:

$$t_2 = t_1$$
$$t_0 = .2 D_0$$
$$l_1 = 2.12(D_1 - (D_1^2 - D_0^2)^{\frac{1}{2}})$$
$$D_p = (D_0 - 2t_0) - .020$$
$$\text{Cu wire length} = .5 \text{ inch}$$

The venturi 11 was constructed from 270 nickel and the copper wire 15 from OFHC copper. Other material combinations can be used, however, depending on the temperature and material compatibility requirements. For example, other combinations comprise Mo-Pa, W-Mo, Re-Mo and Nb-Mo. Soak temperatures for these materials are adjusted for an alloy composition of approximately 80%–20% by weight.

Also, the middle portion of the venturi was uniform in outside diameter and wall thickness and formed a taper of 60° with the opposite end portions A of increased uniform inside diameter and uniform wall thickness. Additionally, the wire was .5 inch long and its ends B extended through the ends of a ⅛" long middle venturi portion and slightly beyond the small equal diameter aperture at the center of the tapered portions of the venturi. The leads 21 and 23 from the heating source also connected to removable contacts C on the opposite low resistance, large diameter portions A of the venturi.

It is understood from the above that the system of this invention is also advantageously employed in the manufacture of heat pipes or other high temperature low pressure services.

It is also understood that the copper wire can provide a leakage space in the venturi by loosely fitting a wire in the venturi while the wire remains in electrical contact therewith.

It is further understood that the converter may be operated at higher temperatures and the filling reservoir, which may also be at lower or higher temperatures than described above may also be used without an internal cesium adsorption reservoir or with an internal cesium adsorption reservoir in the converter, as described in the above cited copending application.

The closure of this invention has the advantage of providing an effective and economic in-line, high temperature, high vacuum, fusible, circuit breaking closure for thermionic converters and heat pipes in a vacuum environment. Moreover, the system of this invention operates to close the exhaust and/or filling line for these converters and heat pipes without disturbing the high temperature equilibrium thereof. Additionally, the system of this invention closes and severs a tube connecting thermionic converter and heat pipe with the filling reservoir and/or the exhaust line therefor in a dependable trouble-free manner, while the devices are in operation at high temperature and low pressure and without the loss of material or pressure therefrom.

I claim:

1. In the manufacture of a thermionic converter having a predetermined low pressure and high temperature therein, the converter having a tube forming a vacuum enclosed, fusible, circuit breaking nickel venturi connecting the converter with a low pressure, high temperature gas source therefor, comprising filling the converter from the gas source through a space provided between the venturi and a copper wire therein with a predetermined amount of gas at a predetermined low pressure and high temperature in the converter, passing an electrical resistance heating current through the fusible, circuit breaking venturi and copper wire therein to form a nickel-copper solid solution alloy that seals the tube shut across the venturi while the predetermined amount of gas, pressure and temperature in the converter are maintained and slowly increasing the current to break the heating current circuit to sever the tube and alloy across the middle portion of the venturi and to form concave terminal menisci at the opposite severed circuit breaking ends of the venturi that cool and solidify while minimizing the temperature equilibrium in the converter.

2. The invention of claim 1 in which said current sequentially is held at between 150 to 200 amps at 1½ to 2 volts for from one to two minutes to form said alloy at between 1100° C. to 1150° C., and then is slowly increased to between 250 to 300 amps at 2 to 3 volts during about one minute to sever said venturi and to produce said terminal menisci that solidify in the severed ends of said venturi.

References Cited

UNITED STATES PATENTS

| | | | |
|---|---|---|---|
| 1,914,634 | 6/1933 | Eden et al. | 53—8 X |
| 2,554,328 | 5/1951 | Grimes | 219—149 X |
| 2,649,993 | 8/1953 | Burdick et al. | 53—8 X |
| 2,714,785 | 8/1955 | Roovers | 53—9 |
| 3,290,477 | 12/1966 | Chopp | 219—149 X |

RICHARD M. WOOD, *Primary Examiner.*

B. A. STEIN, *Assistant Examiner.*

U.S. Cl. X.R.

219—117, 68, 149, 72; 53—8; 337—296